United States Patent
Irish et al.

(10) Patent No.: US 10,462,610 B1
(45) Date of Patent: Oct. 29, 2019

(54) LOW LATENCY CLIENT LOCATION ESTIMATION WITH DYNAMIC INTEGRATION OF SERVER OUTPUT

(71) Applicant: Uber Technologies, Inc., San Francisco, CA (US)

(72) Inventors: Andrew Irish, Mountain View, CA (US); Venkata Sathya Praveen Gorthy, Pleasanton, CA (US); Mohammed Waleed Kadous, Santa Clara, CA (US); Daniel Iland, Oakland, CA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

(21) Appl. No.: 16/197,938

(22) Filed: Nov. 21, 2018

Related U.S. Application Data

(60) Provisional application No. 62/757,081, filed on Nov. 7, 2018.

(51) Int. Cl.
| | | |
|---|---|---|
| *H04W 4/029* | (2018.01) | |
| *H04W 40/24* | (2009.01) | |
| *H04L 29/06* | (2006.01) | |
| *H04L 29/08* | (2006.01) | |

(52) U.S. Cl.
CPC ............ *H04W 4/029* (2018.02); *H04L 67/18* (2013.01); *H04L 67/42* (2013.01); *H04W 40/244* (2013.01)

(58) Field of Classification Search
CPC .... H04W 4/029; H04W 40/244; H04L 67/18; H04L 67/42
See application file for complete search history.

(56) References Cited

U.S. PATENT DOCUMENTS

| | | | | |
|---|---|---|---|---|
| 2003/0100313 A1* | 5/2003 | Ogino | ..................... | G01S 19/12 |
| | | | | 455/456.1 |
| 2013/0238236 A1* | 9/2013 | Thrun | .................. | G01C 21/206 |
| | | | | 701/418 |
| 2014/0244164 A1* | 8/2014 | Gale | ...................... | G01C 21/30 |
| | | | | 701/446 |
| 2015/0285637 A1* | 10/2015 | Kelly | ...................... | G01C 21/12 |
| | | | | 701/430 |
| 2017/0238136 A1* | 8/2017 | Smith | .................. | H04W 4/029 |
| | | | | 455/456.3 |
| 2017/0245116 A1* | 8/2017 | Chu | ...................... | H04W 4/043 |
| 2018/0091939 A1* | 3/2018 | Venkatraman | ........ | H04W 4/021 |

* cited by examiner

*Primary Examiner* — Ernest G Tacsik
(74) *Attorney, Agent, or Firm* — Fenwick & West LLP

(57) ABSTRACT

A client device maintains location state data including a first location estimate of a geographic location of the client device. The first location estimate is based on a first motion measurement obtained over a first time period. The client device retrieves a second motion measurement obtained over a second time period subsequent to the first time period and uses it and the first location estimate to generate a second location estimate. The client device sends the second location estimate to a server. The server further processes the second location estimate to generate an updated second location estimate. The client device retrieves a third motion measurement and generates a third location estimate. The client device receives the updated second location estimate and uses it to adjust the third location estimate. A fourth location estimate is generated using the adjusted third location estimate.

20 Claims, 6 Drawing Sheets

LOW LATENCY CLIENT LOCATION ESTIMATION WITH DYNAMIC INTEGRATION OF SERVER OUTPUT

CROSS REFERENCE TO RELATED APPLICATIONS

This application claims the benefit of Provisional Application No. 62/757,081, filed on Nov. 7, 2018, which is incorporated herein by reference.

TECHNICAL FIELD

The present disclosure relates to location estimation and in particular to determining a location estimate for a computing device.

BACKGROUND

Geolocation systems such as the Global Positioning System (GPS), GLONASS, BeiDou Navigation Satellite System, and Galileo positioning system are Global Navigation Satellite Systems (GNSS) that include groups of satellites that broadcast signals containing information such that corresponding earth-based receivers that receive a signal can identify the satellite that generated the signal. Based on time of arrival measurements for signals from at least 4 satellites, a GNSS receiver estimates its three-dimensional (3D) location and velocity as well as its timing offset from highly accurate atomic clocks used by the satellites. This is a generalization of the concept of trilateration, which the GNSS receiver uses to generate a location estimate. However, GNSS systems are often inaccurate, especially under certain conditions, such as in urban canyons, where signal reflections can cause GNSS receivers to generate location estimates that are dozens of meters off from the true geographic location of the GNSS receiver.

Accurate location estimates are important to various applications, such as route navigation, whether for use in mapping software for a driver of a vehicle, for use by an autonomous vehicle, for use by a pedestrian using a mapping application upon a mobile computing device, or so on. For example, accurate location estimates are important for situations where a vehicle is picking up or dropping off cargo or passengers. As a particular example, a passenger waiting for pickup at a busy airport terminal may have trouble telling where the pickup vehicle is located if the vehicle's location estimate has a margin of error in the dozens of meters, which could encompass a stretch of sidewalk that many vehicles are adjacent to.

Location estimation using GNSS trilateration can be improved using various techniques. However, said techniques often involve latencies that can lower the utility of the location estimate if the GNSS receiver is moving, especially when the GNSS receiver is moving quickly. For example, if a location estimate takes two seconds to generate for a GNSS receiver moving thirty meters per second, the GNSS receiver will have moved sixty meters from the location being estimated in the time it takes to generate the location estimate. As such, the location estimate does not accurately represent the current location of the GNSS receiver and therefore has less utility for purposes such as navigation.

SUMMARY

A location estimation system estimates the location of a client device. The location estimation system includes a motion summarizer upon a client device and a position estimator upon a server. Both the motion summarizer and position estimator generate location estimates for the client using data collected by the client.

Existing location estimation techniques involving the use of a particle filter typically involve significant latency, as such techniques generally involve a client obtaining a set of location data, the client sending the location data to a server, processing of the data by the server to generate a location estimate, and the return of the location estimate to the client. The generation of location estimates in such a manner, with significant latency, may be sufficient for slow moving clients, but for faster moving clients such as vehicles it is beneficial that location estimates are generated at a quicker rate. However, the amount of processing involved in using a particle filter to generate location estimates exceeds the capabilities of most if not all clients. As such, the particle filter cannot simply be moved to the client to reduce latency.

Furthermore, exclusively using a server to generate location estimates can cause situations where the client does not receive location estimates due to loss of connection to the server, e.g. when the network connecting the client and server is interrupted, such as by the entrance of the client into a tunnel. In contrast, using the structures and methods described herein, by including location estimation functionality upon both the client and server, the client may continue to generate location estimates even when disconnected from the server, and, using the "rewind" techniques described below, may incorporate location estimates from the server upon reconnection. The client may also use alternative location estimation techniques even when disconnected from the server, such as performing trilateration using Bluetooth beacons within the exemplary tunnel, e.g., upon detecting a dropped network connection and/or upon receipt of a Bluetooth beacon signal.

The inclusion of location estimation functionality upon both the client and server, in conjunction with the "rewind" techniques described herein, provides at least several benefits. Clients may generate location estimates with lower latency, e.g. using client-side location estimation. Clients may also benefit from the greater accuracy provided by the server-generated location estimates (upon eventual receipt of those location estimates), even if the client has generated new location estimates itself in the meantime. In this manner, the client may achieve low latency location estimation as well as robust location estimation that uses multiple techniques to increase accuracy and account for dropped network connections to servers. This increased location accuracy enhances the ability to perform location-based and location-aware functions and services, such as, for example, mobile navigation, route guidance, and autonomous driving.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
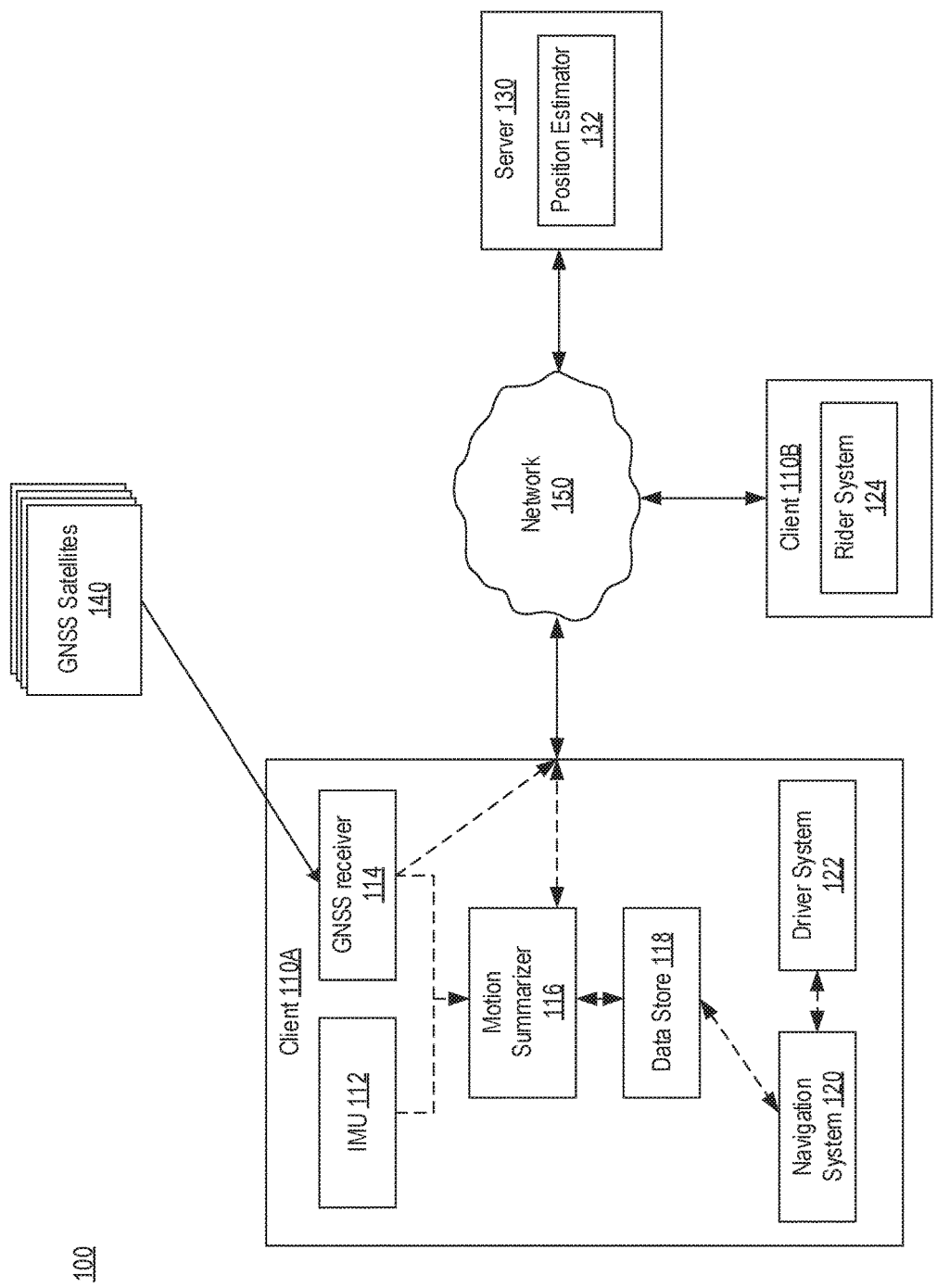
FIG. 1 is a block diagram illustrating a location estimation system according to one embodiment.

FIG. 1 is a block diagram illustrating a location estimation system 100 according to one embodiment. The location estimation system 100 includes two client devices 110, a server 130, and a set of Global Navigation Satellite System (GNSS) satellites 140. The clients 110 and server 130 are connected by a network 150. In other embodiments, the location estimation system 100 may include fewer, other, or additional components. For example, the location estimation system 100 could alternatively include a single client 110, or more than two clients 110.

FIG. 1 uses like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A" and/or "110B" in the figures.

A client 110 is an electronic device used to perform functions such as executing software applications for various purposes. For example, the client 110 may be used by a user for communication with users of other clients, or for navigation using a mapping application. Alternatively, the client 110 may be used for semi-autonomous or autonomous tasks without direct use by a user, such as navigation by a self-driving car. In some embodiments, the client 110 is a computing device such as a laptop, tablet, or smartphone. In other embodiments, the client 110 is a vehicle including a computing component, such as a car that has a computer system.

Client 110A includes an inertial measurement unit (IMU) 112, a GNSS receiver 114, a motion summarizer 116, a data store 118, a navigation system 120, and a driver system 122. In various embodiments the client 110A may include fewer, other, or additional components. For example, in other embodiments the client 110A may not include a navigation system 120 and/or a driver system 122, instead including a computer vision component, an autonomous driving component, or so on.

The IMU 112 includes an accelerometer and a gyroscope, and in various embodiments may further include a compass, magnetometer, speedometer, barometer, and/or other sensors. The IMU 112 measures the client's 110A specific force and angular rate, and in some embodiments measures the magnetic field surrounding the client 110A. The IMU 112 combines the various measurements taken by its sensors to output an inertial measurement (or a "motion measurement") that represents the client's 110A motion, e.g. heading and movement, over a period of time. For example, if the IMU 112 generates motion measurements for one second intervals, a certain motion measurement represents the movement of the client 110A over a certain one second period of time. As a specific example, if the client 110A is moving at 10 meters per second (m/s) Northward, and does not change velocity, then for a one second interval the IMU 112 generates a motion measurement indicating that the client 110A moved forward 10 meters without changing its heading. Motion measurements may be paired with or may include time periods, e.g. timestamps, indicating the time period over which the motion measurement was recorded. Depending upon the embodiment, if additional sensors are included in the IMU 112, such as a barometer, the measurements taken by the IMU 112 and the motion measurement generated therefrom may be extended using additional measurements from the additional sensors. For example, an IMU 112 including a barometer may extend the motion measurement three-dimensionally, providing an elevation component to the motion measurement.

In an embodiment, the IMU 112 performs dead reckoning using one or more stored location estimates and one or more motion measurements to generate a new location estimate. For example, the IMU 112 retrieves or generates a location estimate for a certain time, then uses a subsequent motion measurement recorded at a subsequent time to advance from the location estimate, thereby generating a subsequent location estimate for the subsequent time. Alternatively, the IMU 112 sends motion measurements or the raw sensor data to the motion summarizer 116.

The GNSS receiver 114 receives GNSS signals from GNSS satellites 140. In an embodiment, the GNSS receiver 114 estimates the location of the client 110A based on the received signals. For example, the GNSS receiver 114 may estimate the location of the client 110A based on signals from four or more of the GNSS satellites 140. For example, the GNSS receiver 114 is a GPS receiver that uses signals from four GPS satellites to estimate its three-dimensional location as well as its timing offset from highly accurate atomic clocks used by the GPS satellites 140. In general, the GNSS receiver 114 may perform trilateration based on the received signals. Alternatively, the GNSS receiver 114 may send the received signals to the motion summarizer 116 for use in location estimation. In some embodiments, the GNSS receiver 114 sends the received signals, or data derived therefrom, to both the motion summarizer 116 and the server 130.

The IMU 112 and GNSS receiver 114 are, generally, "location sensors" that receive, derive, measure, or otherwise obtain location data, such as raw sensor readings. Depending upon the embodiment, other location sensors may be included and used in the system 100, whether included within, attached to, or communicatively connected with the client device. Output from the other location sensors may be further factored into the generation of location estimates by the motion summarizer 116.

The motion summarizer (MS) 116 fuses output from the IMU 112, GNSS receiver 114, and/or server 130 to generate location estimates. If the IMU 112 sends the MS 116 a location estimate, the MS 116 stores the location estimate (e.g., in the data store 118) until a server location estimate corresponding to the estimate is received from the server 130, as described in greater detail below. If the IMU 112 sends the MS 116 a motion measurement recorded at a particular time, the MS 116 performs dead reckoning using the motion measurement and a stored location estimate to generate a new location estimate for the particular time. If the IMU 112 sends the MS 116 raw sensor data, the MS 116 uses the data to generate a motion measurement, which the MS 116 then uses to perform dead reckoning. Depending upon the embodiment, the IMU 112 may only send one type of data to the MS 116 (e.g., only one of raw sensor data, a motion measurement, or a location estimate), and the MS 116 may only be capable of a subset of the actions described above. Similarly, in some embodiments the MS 116 may receive a location estimate from the GNSS receiver 114, or may generate a location estimate based on received GNSS signals, which may be fused with the motion measurement-based location estimate to generate a composite location estimate. The composite location estimate may be fused with a location estimate from the server 130 (a "server location estimate") to generate a corrected location estimate.

In some embodiments, neither the MS 116 nor the GNSS receiver 114 generates a location estimate based on the received GNSS signals, and instead solely involves motion measurement-based location estimates and server 130 location estimates. For purposes of clarity, the present disclosure is described using such an embodiment, though a person having ordinary skill in the art will recognize that a motion measurement-based location estimate can instead be a composite location estimate.

Location estimates based on motion measurements generally decrease in accuracy over time due to drift. Drift results from an accumulation of the error of each estimation. For example, if a first motion measurement-based location estimate is 0.5 meters off, and a second such estimate is an additional 0.5 meters off, the second motion measurement-based location estimate has in fact drifted 1 meter from the true position due to the error accumulating from the first and second motion measurement-based location estimates. Such drift may be addressed by fusing the motion measurement-based location estimates with other data, such as GNSS data, shadow matching data, road matching data, Bluetooth beacon data, Wi-Fi positioning data, and so on. However, generating location estimates based on these additional data typically requires significant computer processing with enough latency that it is not feasible to do so in real time upon a client 110. As such, the client 110A sends motion measurement-based location estimates and/or received GNSS signals to the server 130 for additional processing. Upon receipt of a server location estimate in response, the MS 116 incorporates the received server location estimate to update subsequent location estimates, as described in further detail below, such as with reference to FIGS. 3-5.

Depending upon the embodiment, the MS 116 fuses motion measurement-based location estimates with location estimates received from the server 130 (server location estimates) to generate a corrected location estimate, e.g. a motion measurement-based location estimate that uses another location estimate to correct for the drift from dead reckoning. The server location estimates serve as additional factors towards which the motion measurement-based location estimates are "pulled." However, as detailed below, the server 130 generates location estimates with greater latency than the client 110; as such, a location estimate received from the server 130 typically does not correspond to a most-recent motion measurement-based location estimate, so the MS 116 often "rewinds" the location estimates to incorporate the new data.

In an embodiment, the MS 116 uses an extended Kalman filter to fuse the various location estimates of the IMU 112 and server 130 (e.g., motion measurement-based location estimates and server location estimates). The extended Kalman filter is a non-linear version of the Kalman filter that linearizes the various location estimates (which are probability distributions) about their mean, using, for example, multivariate Taylor Series expansions, and then passes the linearized location estimates through a standard Kalman filter. In general, the Kalman filter is an efficient recursive filter that estimates the internal state of a linear dynamic system from a series of noisy measurements. The Kalman filter produces an estimate of the state of the system as an average of the system's predicted state and of a new measurement using a weighted average. For example, the Kalman filter uses a motion measurement-based location estimate (predicted state) and a server 130 location estimate (the new measurement) to produce a corrected location estimate (an estimate of the state of the system). The corrected location estimate is typically more accurate than any of its component location estimates, and is therefore more useful for purposes such as navigation, localization, and tracking.

In an embodiment, the MS 116 sends the generated location estimate to the data store 118 for storage, thereby maintaining location state data of the client 110A. Location state data of the client 110A is location information for the client 110A for one or more particular time periods. For example, location state data may be a location estimate of the client 110A for a particular time period, which represents a "state" of client 110A over the particular time period. Thus the data store 118 records both the location estimate and the time over which the data used to generate the location estimate is obtained. Stored client 110A states may be retrieved by the MS 116 for use in location estimation, such as for use as a first location estimation to which an inertial measurement is applied as part of dead reckoning. Furthermore, the MS 116 may send the motion-based location estimate and/or received GNSS signals to the server 130 via the network 150.

The data store 118 stores data and may be, for example, a relational or non-relational database. In various embodiments, other components of the client 110A may communicate with the data store 118 to read data recorded in the data store 118 or to write to the data store 118, thereby adding one or more records to the data store 118. For example, the data store 118 may store location estimates and times associated therewith that are received from the MS 116. Furthermore, the navigation system 120 may read from the data store 118, retrieving, for example, one or more location estimates and times associated therewith. In an embodiment, the data store 118 may be completely within memory, such as random access memory (RAM), of the client 110A, and not on secondary memory such as a hard drive or disk.

The navigation system 120 uses location estimates to generate routes for navigational use from a current location of the client 110A to a destination location. In an embodiment, destination locations are sent to the navigation system 120 via user input to the driver system 122, which communicates the destination location to the navigation system 120. The navigation system 120 uses geographic information such as road maps to generate a route from a current location of the client 110A (as approximated by a location estimate) to the destination location. As the client 110A moves, subsequent location estimates are used to update the route, e.g. to generate a new route if the route is not followed, or to track how much of the route has been completed.

For example, if the client 110A is a car at Union Square in San Francisco, and a user inputs "Golden Gate Park" as a destination location, the navigation system 120 uses geographic information, e.g. electronic map data for San Francisco, to generate the route. The generated route may be, for example, drive West on Geary Boulevard, then turn left on Arguello Boulevard. If the client 110A does not turn left on Arguello Boulevard but instead continues straight on Geary Boulevard (as determined by the navigation system 120 based on one or more location estimates), the navigation system 120 may update the route to include "turn left on $8^{th}$ Avenue."

In an embodiment, the navigation system 120 sends the route to the driver system 122 for presentation to a user of the client 110A upon a display of the client 110A. Alternatively, such as in embodiments where the client 110A is an autonomous vehicle, the route may be used to inform the autonomous vehicle of its path. In an embodiment, the client 110A does not include a navigation system 120.

The driver system 122 incorporates data from the navigation system 120 for use by the client 110A or a user of the client 110A. For example, the driver system 122 may include an autonomous vehicle system that uses routes from the navigation system 120 to inform which path it follows. Alternatively, the driver system 122 may generate user interfaces for display upon a display of the client 110A, with which users of the client 110A may interact to receive information, or to input information such as destination locations. As detailed supra, for example, the driver system 122 may generate a user interface displaying a route generated by the navigation system 120, which may include an electronic map centered on a most recent location estimate of the client 110A.

Alternatively or additionally, the driver system 122 includes a communication system used to communicate with other clients 110, such as client 110B. For example, the driver system 122 may broadcast to clients 110 that the client 110A has open seats, and clients 110B may send requests for use of the open seats (e.g. for transport from one location to another by the client 110A) to the driver system 122. The driver system 122 may generate user interfaces to display requests, and may also display a location of the requesting clients 110 upon an electronic map. In an embodiment, the client 110A does not include a driver system 122.

The set of GNSS Satellites 140 are satellites that broadcast signals containing information such that corresponding earth-based receivers that receive a signal can identify the satellite that generated the signal. The set of GNSS Satellites 140 may be satellites from any GNSS system, such as the Global Positioning System (GPS), GLONASS, BeiDou Navigation Satellite System, and Galileo positioning system.

Client 110B is a client 110 that includes a rider system 124. In an embodiment, client 110B includes the components of client 110A and also the rider system 124. Furthermore, in an embodiment, the client 110A includes a rider system 124. The rider system 124 includes a communication system used to send transportation requests to other clients 110 such as client 110A. The transportation request may include, for example, a current location of the client 110B. In an embodiment, the rider system 124 generates user interfaces for presentation to a user of the client 110B upon a display of the client 110B. The generated user interfaces may include, for example, an electronic map that indicates a current location of the client 110A (as approximated by a location estimate received from the client 11A) with respect to the client 110B.

Server 130 is an electronic device used to perform functions such as executing software applications for various purposes. Depending upon the embodiment, the server 130 may be a singular unit, or may be a distributed system of a plurality of servers. The server 130 includes a position estimator 132. The position estimator 132 uses data received from the client 110A to generate a server location estimate. For example, the position estimator 132 uses a received motion measurement-based location estimate and received GNSS signals to perform shadow matching, e.g. use the motion measurement-based location estimate to inform a draw region, and the GNSS signals to perform shadow matching for the draw region.

Shadow matching involves determining whether a received GNSS signal was reflected (non-line of sight, "NLOS") or was transmitted directly to the GNSS receiver 114 (line of sight, "LOS"). Based on the determination, location information included in the GNSS signal can be adjusted to account for the additional latency involved in NLOS transmissions, thereby generating more accurate location data. This is described in greater detail below. The server 130 generates location estimates using the more accurate adjusted GNSS signals and sends the generated server location estimates to the client 110 over the network 150. Each server location estimate may include a time period associated with the location estimate (e.g., a timestamp associated with the data received from the client 110 that was used to generate the server location estimate).

The received GNSS signals include information about the signal-to-noise ratio (SNR) of each satellite a signal was received from. These SNRs, employed together with information about the propagation environment, can provide valuable information about location that supplements the standard location estimate. In GNSS and other wireless communication, LOS channels are characterized by statistically higher received power levels than those in which the LOS signal component is blocked (e.g., NLOS channels). As a GNSS receiver traverses a geographic area, obstacles (e.g., buildings, trees, or terrain) frequently block the LOS component of different satellite signals, resulting in NLOS channels characterized by statistically lower SNR. While the NLOS channels cannot be relied upon to determine the location estimate of the GNSS receiver, the decrease in SNR does provide information regarding the location of the receiver; namely, that the receiver is within the shadow of a building/infrastructure. Thus, the satellite SNRs yield probabilistic information regarding the receiver's location: higher SNR indicates that the path from the receiver to the satellite is likely LOS, while lower SNR indicates that the path from the receiver to the satellite is likely NLOS. Having knowledge of the layout of the urban environment, the satellite SNR signal can be utilized to determine possible locations for the GNSS receiver based on calculation of positions that would likely be "blocked" or in the shadow of various buildings or structures.

Information regarding the three-dimensional environment, which can be provided in a number of ways, enables probabilistic shadow matching. Such information may be provided in terms of a three-dimensional map, in which space is divided into volumetric pixels, or "voxels," and the probability of each voxel being occupied is specified. Triangulated meshes or other vector based three-dimensional maps may also be used. Alternatively, statistical information on building heights, together with two-dimensional maps and road network data, can also provide the three-dimensional information required for probabilistic shadow matching.

A Bayesian framework is employed to fuse the GNSS signals. For instance, signals from each satellite constitute the measurements driving a nonlinear filter in an example embodiment. The nonlinear filtering algorithms disclosed here fall under the general framework of particle filtering, where importance sampling is included in each filtering step. However, modifications can be made to handle the difficulties unique to the problem of urban localization.

In particular, the GNSS system includes a modified particle filter that provides a mechanism for selecting particles to include in the analysis set. Several different mechanisms can be used, each mechanism with different benefits. For example, in one embodiment, a measurement model employed by the GNSS system acts to increase "uncertainty" in the GNSS particle fix created by the measurement model based on the correlation between successive GNSS fix data. The increase in uncertainty hinders or prevents the GNSS fix from narrowing the particle set down to a specific area, and allows for the possibility that the GNSS fix is the result of a NLOS reflection that resulted in a bad position update. Increasing the uncertainty allows the region outside of this local maximum to be explored by the particle filter and therefore allows for the possibility that the correct position fix will be located.

In another embodiment, the measurement model increases uncertainty based on how built up the environment is. In this way several solutions are presented for allowing a particle filter to explore the space around the reported GNSS fix under the right circumstances to prevent the output estimate from becoming trapped in the wrong location.

In another embodiment, a modified particle filter is utilized that provides a mechanism for selecting particles (outside of the normal selection process) for inclusion in the particle set analyzed. Once again, this has the effect of allowing the particle filter to explore the 3D space surrounding the GNSS fix position, thus allowing the particle filter to avoid becoming captured in local maximums.

During normal operation (e.g., in environments, such as non-urban environments, wherein multipath does not significantly interfere with location determination), the location of a client 110, along with its clock bias, is determined based on the time-of-flight of signals received from multiple satellites. However, sometimes signals reflect off buildings or other environmental features. The reflection results in an increase in the time-of-flight of signal. This affects the GNSS reported pseudorange of the GNSS satellite as compared to pseudorange calculated based on a direct path between communication between the satellite and client 110. Additionally, the reflection or partial blockage of a signal causes a decrease in the SNR of signal. Without taking into account the decrease in SNR, location estimates based on signal will tend to overestimate the distance of the client 110 from a GNSS satellite 140 because the reported pseudoranges are calculated based on the assumption of a LOS path. The result is an erroneous GNSS location estimate.

The position estimator 132 implements a non-linear filter (e.g., particle filter) to fuse received measurement data, including information included in the GNSS signal (location data, pseudorange data, and SNR data), to compute a server location estimate including a conditional distribution of positions. A person of ordinary skill in the art will recognize that a variety of particle filters or other non-linear filters may be utilized to compute the server location estimate. The server location estimate corrects for NLOS signals, and is therefore a GNSS location estimate with less error. In an embodiment, the position estimator 132 performs "one-shot" stateless shadow matching, where previous location estimates are not factored into the generation of a new location estimate, allowing for lower latency. In other embodiments, the particle filter is stateful and uses previous location estimates as a basis for subsequent location estimates, at the expense of greater latency.

In some embodiments, the position estimator 132 further modifies the server location estimate using a road matching model, such as in embodiments wherein the client 110 is a vehicle or is within a vehicle. In general, because vehicles are confined (for the most part) to operate on streets, a pseudo measurement vector of possible street assignments that varies by particle location may be added to the particle filter. In effect, the road matching model constricts particles to the location of a road within the immediate geographic area surrounding the location estimate. For example, if a road is ten meters wide and a vehicle is estimated to be located in the middle of the road, no particle will be drawn more than five meters to either side, as it is highly unlikely that the vehicle is off the road (e.g., driving on the sidewalk).

In some embodiments, the position estimator 132 further modifies the server location estimate using Bluetooth beacon signals, or generates the server location estimate using Bluetooth beacon signals and not GNSS signals. For example, Bluetooth beacons may transmit signals to the client 110, which the client 110 sends over the network 150 to the server 130 along with or instead of the GNSS signals. Bluetooth beacons can be used in segments of road networks where GNSS signals cannot reach, such as within tunnels. As such, using a combination of GNSS signals and Bluetooth beacon signals, the server 132 can provide the client 110 more consistent location estimation, rather than failing to do so during time periods when GNSS signals are obstructed.

Bluetooth beacons broadcast beacon identifiers that distinguish each beacon from one another. Depending upon the embodiment, either the client 110 or the server 130 maintains a mapping of beacon identifiers to location data (e.g. latitude and longitude) used to interpret beacon signals. Each received beacon signal is received at a particular signal strength, which can be used to estimate a distance from the client 110 to the beacon. As such, similar to GNSS signals, beacon signals can be used for trilateration. For example, if the client 110 receives signals from three Bluetooth beacons, the server 130 can determine a latitude and longitude of each beacon using the mapping of beacon identifiers to location data, use the received signal strength indicator (RSSI) of each received signal to estimate a distance from each beacon, and perform trilateration using the latitudes, longitudes, and estimated distances to generate a location estimate (e.g., a probability distribution of possible locations of the client 110).

In some embodiments, the position estimator 132 further or alternatively modifies or replaces the server location estimate with a location estimate generated by a Wi-Fi positioning system via RSSI and trilateration techniques, fingerprinting techniques, angle of arrival techniques, time of flight techniques, or so on using Wi-Fi signals received from a Wi-Fi beacon. Similar to Bluetooth beacon signal-based location estimates, Wi-Fi-based location estimates are probability distributions that can be used to adjust the region wherein particles are drawn in the position estimator's 132 particle filter.

In some embodiments, rather than send Bluetooth signals and/or Wi-Fi signals to the server 130, the client 110 instead directly generates location estimates with the signals, e.g. using the MS 116, which may be configured to adjust motion measurement-based location estimates based on location estimates derived via trilateration using Bluetooth signals and/or Wi-Fi signals.

In an embodiment, the server 130 maintains historic average error for one or more segments of a road network. The historic average error may be collected from a plurality of clients 110 and used to improve subsequent server location estimates. For example, if at a particular road segment a location estimate for a first client errs by 5 meters Westward, and at the particular road segment a location estimate for a second client errs by 7 meters Westward, the server 130 may generate and maintain a historic average error of 6 meters Westward. As such, subsequent location estimations at the particular road segment may factor in the historic average error, e.g. particles may be drawn or weighted more greatly on an Eastern portion of the distribution, or the mean of the particle distribution may be shifted six meters Eastward.

Network 150 enables communications among the clients 110 and the server 130 and can comprise the Internet as well as mobile telephone networks. In one embodiment, the network 150 uses standard communications technologies and/or protocols. The data exchanged over the network 150 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The messages exchanged by the clients 110 can also be encrypted. The entities can use custom and/or dedicated data communications technologies instead of, or in addition to, the ones described above.

GNSS Location Estimation

Figure 2:
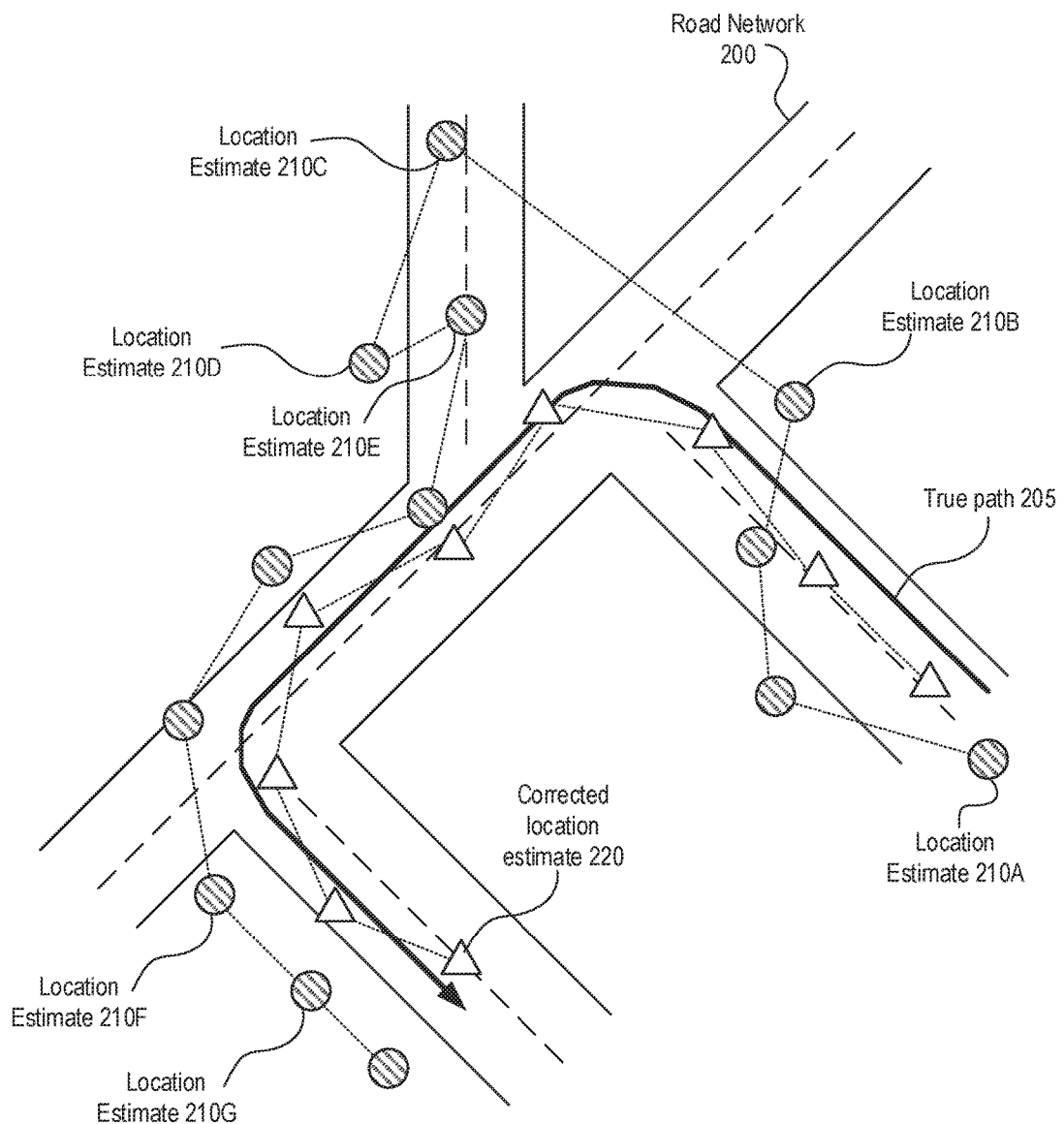
FIG. 2 is an illustration of location estimates, according to one embodiment.

FIG. 2 is an illustration of location estimates, according to one embodiment. FIG. 2 includes a road network 200 and a true path 205 of a client 110 that has traversed the road network 200. The figure also includes a plurality of uncorrected location estimates 210 recorded at various times as the client 110 followed the true path 205 over the road network 200. The uncorrected location estimates in the embodiment of the figure are GNSS-based location estimates without shadow matching, though in other embodiments the uncorrected location estimates 210 could be, for example, motion measurement-based location estimates with similar inaccuracies. FIG. 2 additionally includes corrected location estimates (such as corrected location estimate 220) illustrating the greater accuracy of corrected location estimates as compared to uncorrected location estimates.

As illustrated in the figure, uncorrected location estimates 210 are often highly inaccurate. As described above, this is especially true in urban canyons or the like, where GNSS signals reflect off geographic features like buildings. For example, uncorrected location estimate 210A is to the left of the true path 205, whereas location estimate 210B is to the right of the true path, and isn't even on the road network 200. GNSS signal-based location estimates can err enough that even correcting the estimates with road matching can cause the estimate to match to an entirely different road. This is exemplified by location estimate 210C. Such erroneous changes in (estimated) location like that between location estimate 210B and location estimate 210C are highly unlikely and may even be physical impossibilities.

Uncorrected location estimates can also include other highly unlikely movements, such as a backtracking from location estimate 210D to location estimate 210E. As evidenced by the uncorrected location estimates 210 as a collective set, GNSS signal-based location estimation can be very inaccurate, even when corrections are attempted by techniques such as road matching. However, as described above, GNSS signal-based location estimates for segments of a road network 200 sometimes tend to err similarly for various clients 110 traversing the segment. For example, location estimate 210F and location estimate 210G are a similar distance from the true path 205. If uncorrected location estimates for a plurality of clients 110 err that similar distance from each client's 110 respective true path 205, the location estimation system 100 may generate a historic average error for the segment of the road network 200 between location estimate 210F and location estimate 210G for use in correcting subsequent location estimations.

Likelihood Surfaces

Figure 3:
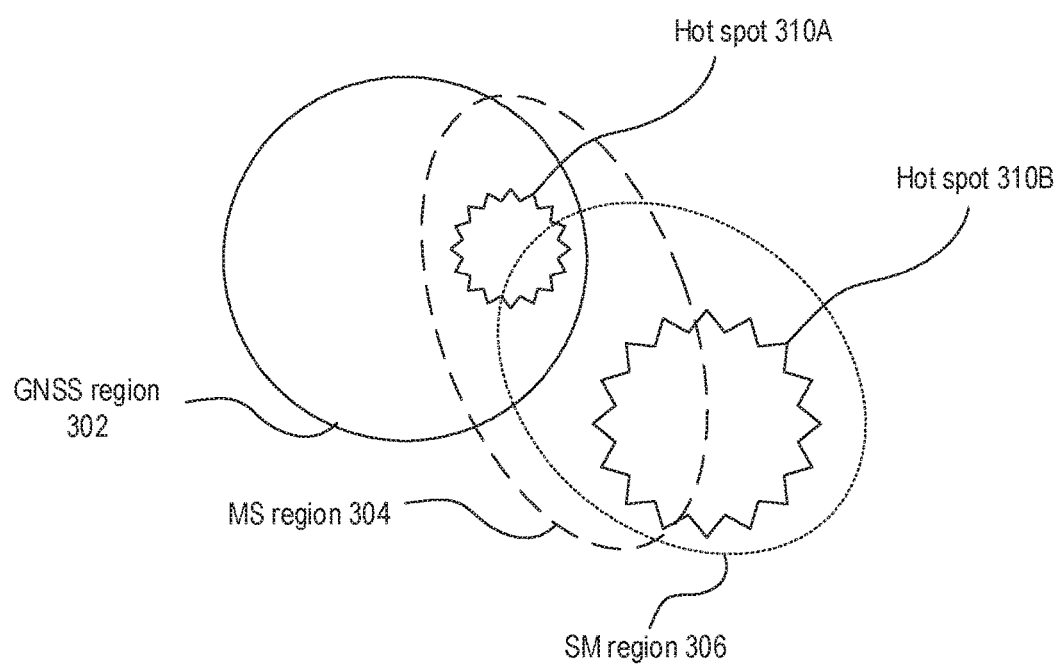
FIG. 3 is an illustration of location estimation likelihood surfaces, according to one embodiment.

FIG. 3 is an illustration of location estimation likelihood surfaces, according to one embodiment. The GNSS region 302 is an area within which a GNSS signal-based location estimation resides. Likewise, the MS region 304 is an area within which a motion measurement-based location estimate resides. Upon receipt of a server location estimation, the MS 116 fuses the new information (the server location estimation) with the motion measurement-based location estimate and, in some embodiments, the GNSS signal-based location estimate.

The server location estimation includes a probability distribution with one or more hot spots 310 of greatest probability. The MS 116 uses the hot spots 310 to inform where particles should be drawn for the corrected location estimate. The corrected location estimate therefore includes one or more Shadow-matched (SM) regions 306, such as one region encompassing the largest hot spot 310B, a larger region encompassing two or more of the largest hot spots 310, or multiple regions, one for each of the largest hot spots, such as one for hot spot 310A and one for hot spot 310B.

Process Flow

FIGS. 4A-D illustrate a "rewind" technique by which the MS 116 updates location estimates based on receiving server location estimates corresponding to past location estimates, according to one embodiment. Each of FIGS. 4A-D includes an actual path 410A-D, which illustrates the actual path traversed by the client 110 in the embodiment at the time each location estimate is generated or updated.

Figure 4A:
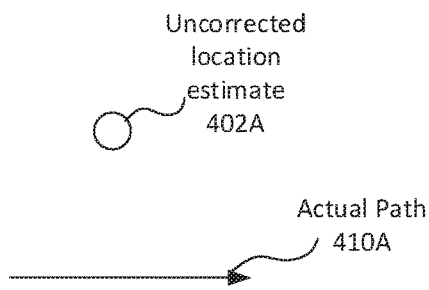
FIGS. 4A-D illustrates a "rewind" technique by which a motion summarizer updates location estimates based on receiving server location estimates corresponding to past location estimates, according to one embodiment.

FIG. 4A illustrates a first uncorrected location estimate 402A for the client 110 as it traverses the actual path 410A. The first uncorrected location estimate 402A is generated for a first time period.

Figure 4B:
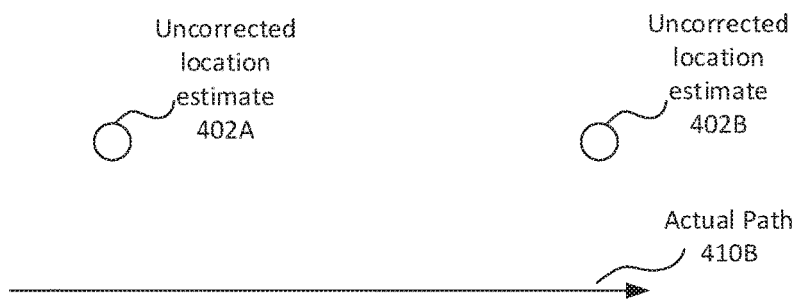

FIG. 4B illustrates a second uncorrected location estimate 402B for the client 110 as it continues to traverse the actual path 410B. The second uncorrected location estimate 402B is generated for a second time period subsequent to the first time period.

Figure 4C:
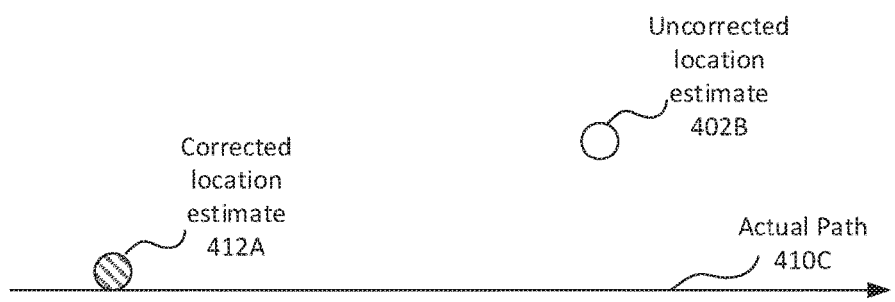

FIG. 4C illustrates correcting the first uncorrected location estimate 402A. The client 110A receives a server location estimate corresponding to the first uncorrected location estimate 402A. As such, the client 110 uses the server location estimate to update the first uncorrected location estimate 402A as described above, thereby generating a corrected location estimate 412A. This is the "rewind." The second uncorrected location estimate 402B is the most-recent location estimate, but the server location estimate corresponds to the first uncorrected location estimate 402A, which corresponds to the first time period, which is before the second time period that corresponds to the second uncorrected location estimate 402B. As such, the client 110A "rewinds" to the first time period and fuses the server location estimate with the first uncorrected location estimate 402A.

Figure 4D:
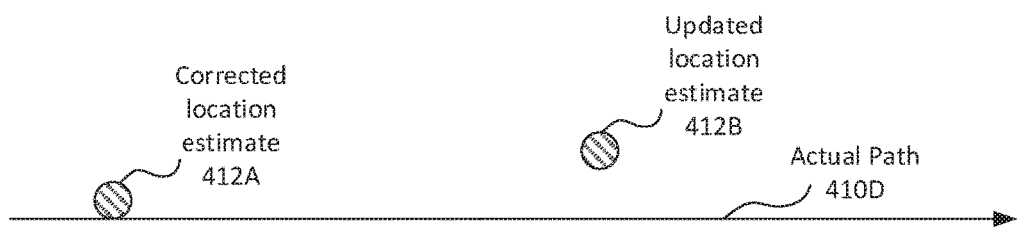

FIG. 4D illustrates updating the second uncorrected location estimate 402B based on the corrected location estimate 412A. After rewinding to update the first uncorrected location estimate 402A, the client 110 uses the corrected location estimate 412A to update the second uncorrected location estimate 402B. Using the more accurate corrected location estimate 412A allows the client 110 to better estimate the location of uncorrected location estimates 412 for time periods subsequent to the first time period. This is because the uncorrected location estimates 402 use dead reckoning, as detailed above; performing dead reckoning from a more accurate location estimate generates more accurate subsequent location estimates, all else being equal, by reducing drift. As such, the client 110 is able to generate a more accurate location estimate for the second time period before receiving a server location estimate corresponding to the second time period. This is illustrated in the figure by updated location estimate 412B, which is closer to the actual path 410D than the uncorrected location estimate 402B. Upon eventual receipt of a server location estimate for the second time period, the client 110 can correct the updated location estimate 412B, thereby generating an even more accurate location estimate for the second time period, which can be used to update uncorrected or updated location estimates subsequent to the second time period. Such corrections of updated location estimates 412B can involve a smoothing action where a representation of the correction at a display of the client 110 is updated such that the representation does not jump across the display, but rather smoothly transitions from the uncorrected representation to the corrected representation. This may involve, for example, interpolation between the uncorrected and corrected representations and an animation from the one to the other.

Figure 5:
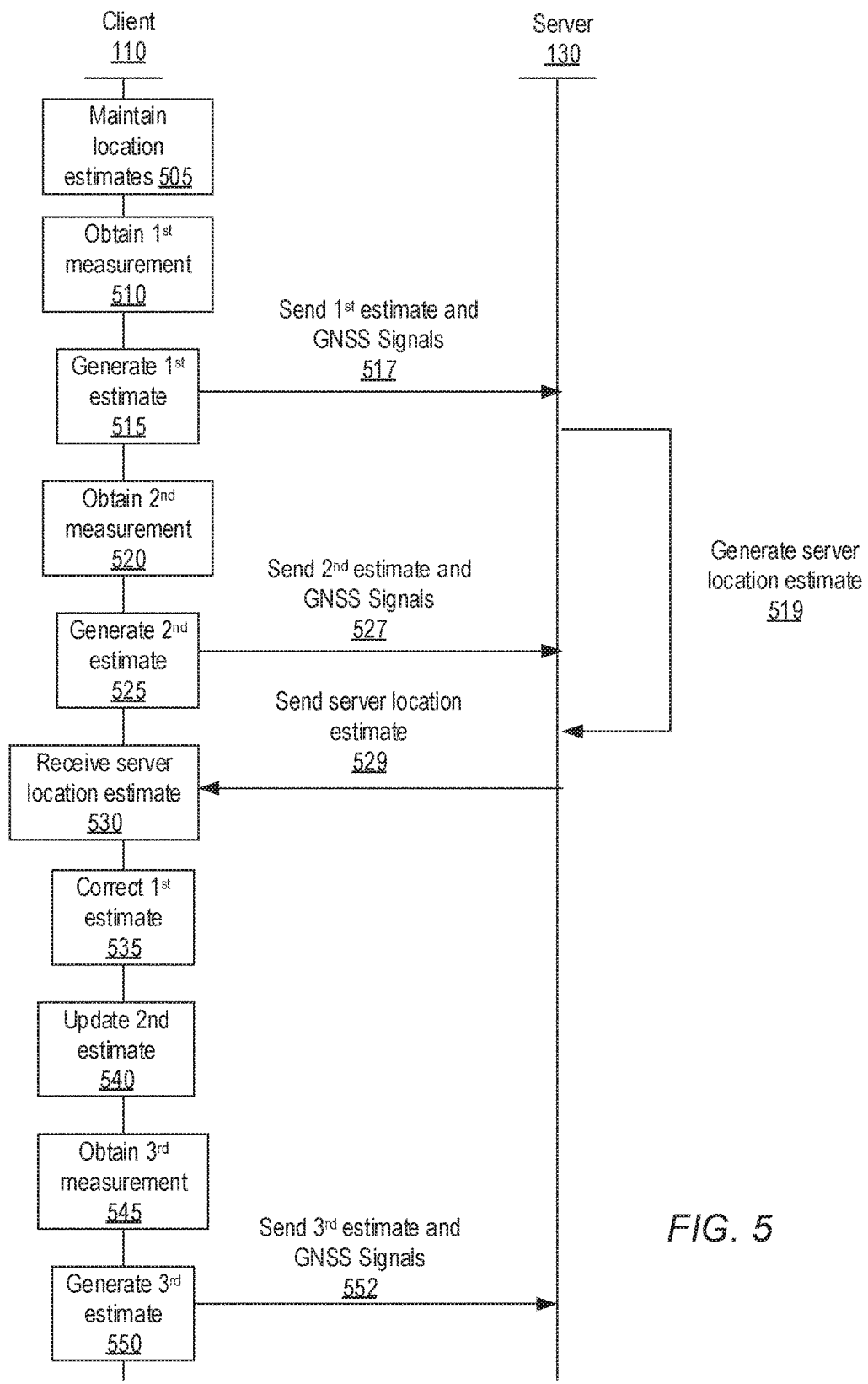
FIG. 5 is a process flow diagram illustrating a location estimation process, according to one embodiment.

FIG. 5 is a process flow diagram illustrating a location estimation process, according to one embodiment. In the embodiment of the figure, the client 110 sends both motion measurement-based location estimates and GNSS signals to the server 130, though in other embodiments the client 110 may send other or additional location state data to the server 130 for processing.

The client 110 maintains 505 one or more location estimates in the data store 118, such as corrected location estimates, updated location estimates, uncorrected location estimates, received server location estimates, and the like. Depending upon the embodiment, the client 110 may replace uncorrected location estimates with corresponding updated location estimates, and likewise may replace updated location estimates with corrected location estimates, thereby preserving memory space. In some embodiments, the client 110 also maintains 505 one or more motion measurements, GNSS signals, or the like.

The client 110 obtains 510 a first measurement. For example, the client 110 records a motion measurement for a first period of time and a first set of GNSS signals for the first period of time (or a particular moment in time within the first period of time).

The client 110 generates 515 a first uncorrected location estimate, as detailed above, based on the first measurement. The client 110 sends 517 the first uncorrected location estimate and the first set of GNSS signals to the server 130. The server 130 begins generating 519 a server location estimate for the first period of time based on the first set of GNSS signals (and, in some embodiments, the first uncorrected location estimate).

The client 110 obtains 520 a second measurement. For example, the client 110 records a motion measurement for a second period of time and a second set of GNSS signals for the second period of time (or a particular moment in time within the second period of time).

The client 110 generates 525 a second uncorrected location estimate, as detailed above, based on the second measurement and the first uncorrected location estimate. The client 110 sends 527 the second uncorrected location estimate and the second set of GNSS signals to the server 130. The server 130 is still generating 519 the server location estimate corresponding to the first uncorrected location estimate, and so does not begin generating a server location estimate for the second uncorrected location estimate. However, in some embodiments, the server 130 is capable of generating multiple server location estimates simultaneously. In such embodiments, the server 130 may begin generating a server location estimate for the second period of time upon receipt of the second uncorrected location estimate and the second set of GNSS signals.

The server 130 finishes generating 519 the server location estimate for the first period of time and sends 529 the server location estimate to the client 110. Upon receiving 530 the server location estimate, the client 110 corrects 535 the first uncorrected location estimate and updates 540 the second uncorrected location estimate.

The client 110 obtains 545 a third measurement. For example, the client 110 records a motion measurement for a third period of time and a third set of GNSS signals for the third period of time (or a particular moment in time within the third period of time). The client 110 generates 550 a third uncorrected location estimate based on the updated second location estimate and the third measurement. The client 110 then sends 552 the third uncorrected location estimate and the third set of GNSS signals to the server 130.

The process may continue, with the client 110 correcting and updating location estimates as the client 110 receives server location estimates. Furthermore, the client 110 may store and retrieve location estimates and/or measurements, e.g. in and from the data store 118, at or between various steps in the process described above. Additionally, the process described above may have additional, fewer, or other steps, depending upon the embodiment. For example, various alternative embodiments could include a 'send location estimate to other client' step where the client 110 sends a location estimate to another client 110.

Computing Hardware

Figure 6:
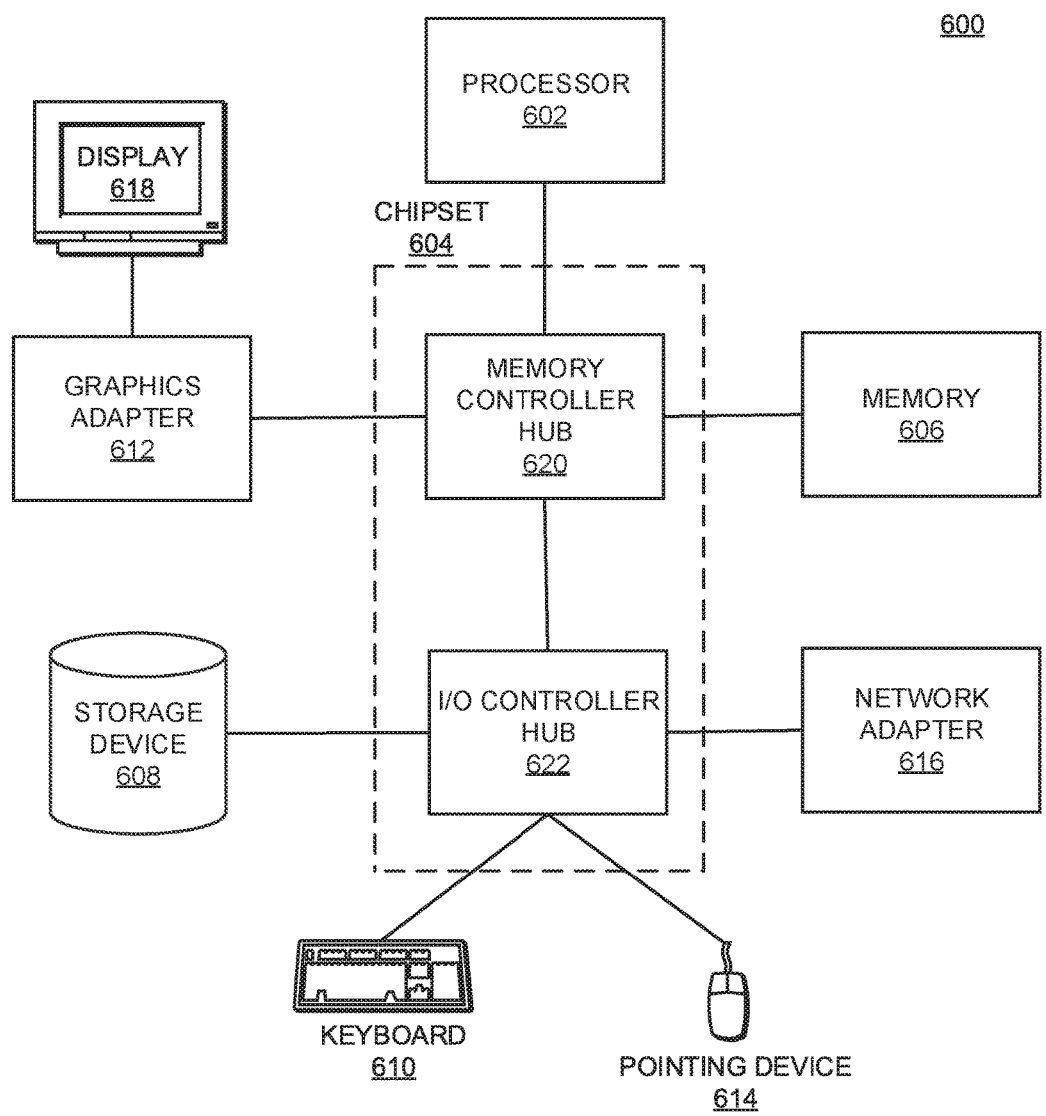
FIG. 6 is a block diagram that illustrates a computer system, according to one embodiment.

The entities shown in FIG. 1 are implemented using one or more computers. FIG. 6 is a block diagram that illustrates a computer system 600 for acting as a client 110 or server 130, according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to the network 120.

As is known in the art, a computer 600 can have different and/or other components than those shown in FIG. 6. In addition, the computer 600 can lack certain illustrated components. For example, the computer acting as the server 130 can be formed of multiple blade servers linked together into one or more distributed systems and lack components such as keyboards and displays. Moreover, the storage device 608 can be local and/or remote from the computer 600 (such as embodied within a storage area network (SAN)).

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for estimating a location of a client device, the computer-implemented method comprising:
   generating, by a motion summarizer of a client device, a first location estimate for the client device, based on first output from at least one location sensor and corresponding to a first time period;
   sending, by the client device, to a server, the first location estimate;
   generating, by the motion summarizer of the client device, a second location estimate for the client device, based on the first location estimate and on second output from at least one location sensor and corresponding to a second time period subsequent to the first time period;
   receiving, by the client device, from the server, after generating the second location estimate, a server location estimate for the first time period corresponding to the first location estimate, wherein the server location estimate comprises a location estimate based on a non-linear filter;
   correcting, by the client device, the first location estimate based on the received server location estimate;
   responsive to correcting the first location estimate, updating, by the client device, the second location estimate based on the corrected first location estimate; and
   using, by the client device, the updated second location estimate to update a location-aware service of the client device.

2. The computer-implemented method of claim 1, further comprising:
   receiving, from each of one or more Bluetooth beacons, a Bluetooth beacon signal; and
   adjusting, by the client device, the second location estimate based on the one or more received Bluetooth beacon signals.

3. The computer-implemented method of claim 1, wherein at least one of the first output and second output is one or more GNSS signals and at least one location sensor is a GNSS receiver, and wherein sending, by the client device, to the server, the first location estimate, further comprises sending the one or more GNSS signals.

4. The computer-implemented method of claim 1, wherein the received server location estimate is based on a historic average error for a segment of a road network.

5. The computer-implemented method of claim 1, wherein using the updated second location estimate to update a location-aware service of the client device comprises updating an electronic map, the method further comprising:
   displaying, upon a display of the client device, the updated electronic map.

6. The computer-implemented method of claim 1, further comprising:
   receiving, from each of one or more Wi-Fi beacons, a Wi-Fi signal; and
   adjusting, by the client device, the second location estimate based on the one or more received Wi-Fi signals.

7. The computer-implemented method of claim 1, wherein at least one location sensor is an inertial measurement unit.

8. A non-transitory computer-readable storage medium storing computer program instructions executable by a processor to perform operations for estimating a location of a client device, the operations comprising:
   generating, by a motion summarizer of a client device, a first location estimate for the client device, based on first output from at least one location sensor and corresponding to a first time period;
   sending, by the client device, to a server, the first location estimate;
   generating, by the motion summarizer of the client device, a second location estimate for the client device, based on the first location estimate and on second output from at least one location sensor and corresponding to a second time period subsequent to the first time period;
   receiving, by the client device, from the server, after generating the second location estimate, a server location estimate for the first time period corresponding to the first location estimate, wherein the server location estimate comprises a location estimate based on a non-linear filter;
   correcting, by the client device, the first location estimate based on the received server location estimate;
   responsive to correcting the first location estimate, updating, by the client device, the second location estimate based on the corrected first location estimate; and
   using, by the client device, the updated second location estimate to update a location-aware service of the client device.

9. The non-transitory computer-readable storage medium of claim 8, the operations further comprising:
   receiving, from each of one or more Bluetooth beacons, a Bluetooth beacon signal; and
   adjusting, by the client device, the second location estimate based on the one or more received Bluetooth beacon signals.

10. The non-transitory computer-readable storage medium of claim 8, wherein at least one of the first output and second output is one or more GNSS signals and at least one location sensor is a GNSS receiver, and wherein sending, by the client device, to the server, the first location estimate, further comprises sending the one or more GNSS signals.

11. The non-transitory computer-readable storage medium of claim 8, wherein the received server location estimate is based on a historic average error for a segment of a road network.

12. The non-transitory computer-readable storage medium of claim 8, wherein using the updated second location estimate to update a location-aware service of the client device comprises updating an electronic map, the operations further comprising:

displaying, upon a display of the client device, the updated electronic map.

13. The non-transitory computer-readable storage medium of claim 8, the operations further comprising:
receiving, from each of one or more Wi-Fi beacons, a Wi-Fi signal; and
adjusting, by the client device, the second location estimate based on the one or more received Wi-Fi signals.

14. The non-transitory computer-readable storage medium of claim 8, wherein at least one location sensor is an inertial measurement unit.

15. A system, comprising:
a processor for executing computer program instructions; and
a non-transitory computer-readable storage medium storing computer program instructions executable by the processor to perform operations for estimating a location of a client device, the operations comprising:
generating, by a motion summarizer of a client device, a first location estimate for the client device, based on first output from at least one location sensor and corresponding to a first time period;
sending, by the client device, to a server, the first location estimate;
generating, by the motion summarizer of the client device, a second location estimate for the client device, based on the first location estimate and on second output from at least one location sensor and corresponding to a second time period subsequent to the first time period;
receiving, by the client device, from the server, after generating the second location estimate, a server location estimate for the first time period corresponding to the first location estimate, wherein the server location estimate comprises a location estimate based on a non-linear filter;
correcting, by the client device, the first location estimate based on the received server location estimate;
responsive to correcting the first location estimate, updating, by the client device, the second location estimate based on the corrected first location estimate; and
using, by the client device, the updated second location estimate to update a location-aware service of the client device.

16. The system of claim 15, the operations further comprising:
receiving, from each of one or more Bluetooth beacons, a Bluetooth beacon signal; and
adjusting, by the client device, the second location estimate based on the one or more received Bluetooth beacon signals.

17. The system of claim 15, wherein at least one of the first output and second output is one or more GNSS signals and at least one location sensor is a GNSS receiver, and wherein sending, by the client device, to the server, the first location estimate, further comprises sending the one or more GNSS signals.

18. The system of claim 15, wherein the received server location estimate is based on a historic average error for a segment of a road network.

19. The system of claim 15, wherein using the updated second location estimate to update a location-aware service of the client device comprises updating an electronic map, the operations further comprising:
displaying, upon a display of the client device, the updated electronic map.

20. The system of claim 15, the operations further comprising:
receiving, from each of one or more Wi-Fi beacons, a Wi-Fi signal; and
adjusting, by the client device, the second location estimate based on the one or more received Wi-Fi signals.

* * * * *